J. SACHS.
ELECTRIC SWITCHING AND METER TESTING SYSTEM.
APPLICATION FILED APR. 28, 1915.

1,211,629.

Patented Jan. 9, 1917.
5 SHEETS—SHEET 1.

Witnesses
Otto Hilton.
Franz Miller

Inventor
Joseph Sachs.
By
Attorney

J. SACHS.
ELECTRIC SWITCHING AND METER TESTING SYSTEM.
APPLICATION FILED APR. 28, 1915.

1,211,629.

Patented Jan. 9, 1917.
5 SHEETS—SHEET 4.

Witnesses
Otto Hilton.

Inventor
Joseph Sachs.
Attorney

J. SACHS.
ELECTRIC SWITCHING AND METER TESTING SYSTEM.
APPLICATION FILED APR. 28, 1915.

1,211,629.

Patented Jan. 9, 1917.
5 SHEETS—SHEET 5.

Witnesses
Otto Hilton.
Franz Oertler

Inventor
Joseph Sachs.
By Heath Sutherland
Attorney

UNITED STATES PATENT OFFICE.

JOSEPH SACHS, OF HARTFORD, CONNECTICUT.

ELECTRIC SWITCHING AND METER-TESTING SYSTEM.

1,211,629. Specification of Letters Patent. Patented Jan. 9, 1917.

Application filed April 28, 1915. Serial No. 24,451.

*To all whom it may concern:*

Be it known that I, JOSEPH SACHS, a citizen of the United States, residing at Hartford, in the county of Hartford and State of Connecticut, have invented certain new and useful Improvements in Electric Switching and Meter-Testing Systems, of which the following is a specification.

This invention relates to what I shall for convenience term an electric switching and meter testing system.

One of the several objects of the invention is the provision of means by which with a comparatively small number of parts, a large variety of differently functioning appliances can be obtained. The system involves as a part thereof several units and by a proper selection of one or more of these units with such element or elements as may be required to produce an operative appliance, it is possible for example to obtain single or plural poled cut outs, fitted with either exposed link, screw plug or inclosed fuses; single or plural poled switches, either unfused or fitted with exposed link, screw plug or inclosed fuses; service connection and meter testing blocks (non-switching) unfused or fitted with either exposed link, screw-plug, or inclosed fuses and adapted for use on two or three wire, A. C. or D. C., or three or four wire polyphase; and meter testing switches and service connecting devices which may be either unfused or fused as already indicated and which function as a switch and cut out of the desired polarity, for controlling the circuit as well as constituting a meter-testing device with which it is possible to make meter tests of the meter installed in conjunction with the service controlled by the switch. Any unit or a number of units when assembled and equipped with the necessary coöperative elements to present any one of the appliances in the classes already mentioned, may be unincased or exposed or if desired a protective casing may be provided to inclose and protect such parts as should be protected from interference.

Generally speaking the fundamental unit members entering into the production of appliances in the above mentioned classes, are what may be called base-block units. Each of said base-block units comprises a body element fitted with one or more pairs of connection and contact elements and coöperating with which to open and close the connection between a pair of connection and contact elements, is a connector element. The connector element may be adapted to function as either an unfused connector or a fused connector, and when adapted to serve as a fuse connector it may be of the form and style already illustrated in my other applications, Serial No. 877,113, filed December 14, 1914 and Serial No. 13,895, filed March 12, 1915. The base block units may be either single connector units or plural connector base block units, but irrespective of whether they are provided with single or plural connectors, each of the connectors is individually functionable. So far as concerns the functioning of the respective connectors whether on a single connector base block unit or the connectors of a plural connector base block unit, these are provided with means to function, serve, operate and coact with correlated parts, in the same manner and for the same purpose as has already been indicated in the devices of the applications referred to. It will, therefore, be understood that there may be used with the base block units for the operation of the connector element or elements forming a part of the unit, such switch-operating handles, coupling devices or testing appliances as have already been shown and described or any other forms for performing equivalent functions may be used. Consequently my base block units while comprising such elements as above stated and while the units are coöperatively usable with other elements as for instance switch operating elements, testing elements, incasing elements, etc., I have in the present instance provided a means whereby I am enabled to produce an appliance involving the use of several base block units or by utilizing only one of said base block units, I am enabled to produce a device of another character, or conversely I may have an appliance of one type involving the use of only one of said base block units, and with this base block unit I can associate other base block units and other elements to produce an appliance which functions differently from either of those just mentioned. In other words, my base block units including the connector elements forming a part of the unit, are of such construction, design and form that they are either individually usable or collectively usable and irrespective of whether used either individually or collectively the units are of such construction as to be ready for association or combination with other units to function in connection with either switch operating or testing appliances.

While it will be obvious from what has thus far appeared and from what will appear hereinafter that the design and construction of the several base block units may vary materially, I have found certain forms of units to efficiently meet the desired requirements. I have found that it is desirable to provide base block units of two kinds, types or characters. That is to say a single connector base block unit fitted with a single pair of contacts to receive and coöperate with a single connector unit and a plural connector receiving unit fitted with a plurality of pairs of connector receiving and coöperating contacts, each of which pair of contacts may be fitted with a single connector, which connector may be of any desired nature, some of which are hereinafter described. I have further found that the purposes of my invention are best accomplished by making the so-called above mentioned plural connector unit of what may be called the three-connector receiving type. That is to say this plural-connector-receiving unit is fitted with three pairs of connector-receiving contacts, all or only part of which may be fitted with their coöperating connectors. This three connector unit I have termed the "main" unit, simply because it is larger and is used in combination with the other smaller units which I have termed therefore the "auxiliary" units. It will be understood that the main base block unit may have the three pairs of connector receiving contacts arranged in any desirable manner, but I have found it most efficacious to arrange them side by side. At this point I wish to note that while I have found it desirable that the main unit be of the three connector type, it will be understood that it in no way affects such modification as to the number of connector receiving contact pairs that conditions may show are desirable to provide the main unit. Whatever may be the construction of the main unit, the auxiliary units are advantageously, although not imperatively, of the single connector receiving type.

The connector may be either plain or fused, and if fused may carry any desirable form of fuse. The function of the connector is to act as a circuit controlling element, controlling the connection between its coöperating pair of contacts and functioning either as a switch to open or close the circuit or to make and break the connection between the coöperating contacts when serving as a meter testing appurtenance. In order that such base block unit or units with its or their coöperatively fitted connecting parts may function or serve as a switching device, it is as will be inferred, desirable to provide, as it may be called, a switch-operating element. Where the combined device is to serve merely as a switch, it will be understood that this switch-operating element need not essentially, although it may be, removable, because merely serving as a switch, there is no reason why this operating element or member should be removed. In other instances where, however, the units are combined with the necessary instrumentalities to present a switch which is to also function as a meter-testing appurtenance, then the operating member or element, in order that the device may properly function, is constructed to be easily removable or disconnectible to individually free the connector members with which it normally is associated when serving as a switch. It will be understood that irrespective of whether the operating member or element be permanently connected or readily removably connected with the connector members, these are of the same general type in either instance and furthermore these connector members when connected to the switch-operating element or member serve as circuit-controlling switching members to open and close the wires of the circuit, while these same connectors serve as meter testing connectors when disconnected from the operating member. The casing or housing used with any of the different combinations when such occasion may be necessary or desired, is preferably of one style and size, so that, to provide a casing for any of the different combinations, but one casing with its associated protective and housing parts is necessary. It will be understood, however, that any of the combinations that require a smaller casing may be placed in smaller casings.

I do not restrict myself to the relation of the base block units in any particular manner. For instance I have noted certain points about the base block units and in connection therewith have indicated that preferably, though not essentially, the pairs of contacts are arranged side by side. While for convenience it may be desirable when all the units are present or when two or more of them are utilized in a particular installation, it may be desirable to dispose them side by side, this is not necessary, because they may be relatively disposed in any other order so long as they properly function either alone or in conjunction with the parts with which they may be coöperatively combined for the purposes of that particular combination. Obviously therefore, by virtue of my invention advantages of a pronounced character are secured to both the manufacturer and the user. The manufacturer can with a comparatively small number of parts, when a certain instrument is ordered, select from these parts those necessary to produce such an instrument or appliance. Prior to the present invention the manufacturer in order to supply the demand necessarily had to carry in stock a large number of instruments of different character and function, for instance in the case of ordinary three-pole switches of any particular size, it would be necessary to have unfused switches, link fuse switches, plug fuse switches, inclosed fuse switches and also switches provided with any of the above fuses on the two outside wires, the neutral being plain or unfused. This would merely be an illustration of what would be necessary in the case of a three-pole switch to meet all the present necessities of ordinary commercial demand, and does not take into consideration other appliances such as cut outs, service and meter connection and testing blocks with their great variety of fusings and polar arrangements, and furthermore such of the above devices as need a housing or casing. This means, as will be obvious, a vast saving to the manufacturer in that it is required under the present invention that he carry less stock than is at present demanded. The consumer, purchaser or user can, as will be inferred, buy the parts and assemble them to suit his desires or ends, and in case he buys an organized instrument made up of a number of these parts, adding to or taking from to produce any other combination that may be desired.

In the drawings accompanying and forming part of the present specification I have represented in detail one of the several convenient forms of embodiment of the invention, which will be set forth in detail in the following description. I do not limit myself to this disclosure; I may depart therefrom in several respects within the scope of the invention defined by the claims following said description.

Referring to said drawings.

Like characters refer to like parts throughout the several figures.

Before proceeding with a detailed description of the various parts, I deem it desirable to call attention to several points with reference to the base block units and also to the manner in which these units are held in fixed relationship one to the other or individually so as to provide certain fixed positioning of the connector elements or members irrespective of whether these are a part of a single base block unit or whether they are the connector elements or members of separate but associated base block units.

The base block unit already referred to I consider to comprise as stated a body element fitted with one or more pairs of connection and contact elements and coöperating with which to open and close the connection between a pair of connection and contact elements is a connector element. The body portion with its pair or pairs of connection and contact members may be considered as the base member or element.

In the particular embodiment of my invention hereinafter described, I have found it desirable to use a main base block unit arranged with a plurality of pairs of connection and contact members, three pairs best meeting the conditions, and one or more auxiliary base block units each preferably equipped with a single pair of connection and contact members. The main base block unit may consequently be equipped and generally would be in most cases, with three connectors, although there may be a smaller number used, one or more of the pairs of the connection and contact members being without a connector member. The auxiliary base block unit would be equipped with a single connector member when employed in any particular appliance.

Figure 1:
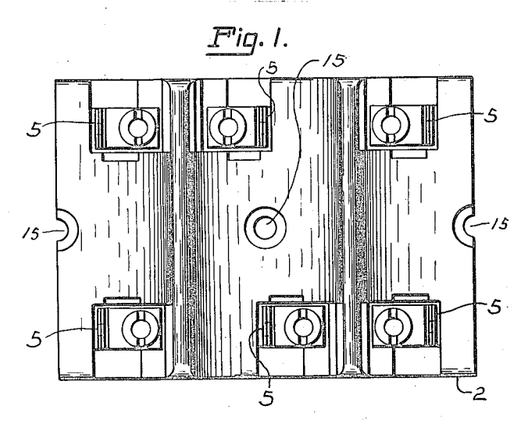
Figure 1 is a top plan view of a main block unit.
Figure 4:
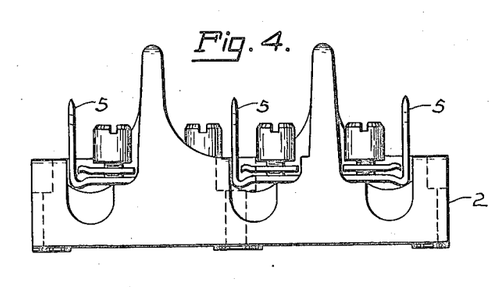
Figs. 4, 5 and 6 are lower end elevations of the units shown in Figs. 1, 2 and 3 respectively.

In Figs. 1 and 4 I have shown a main base member or element which when equipped with its necessary connector elements presents a main base block unit. This base member or element I have denoted in a general way by 2.

Figure 2:
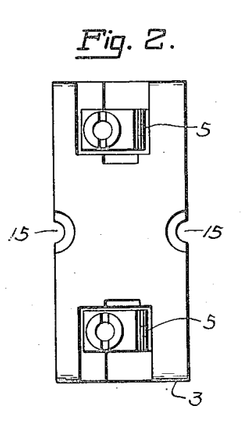
Figs. 2 and 3 are similar views of auxiliary block units.
Figure 3:
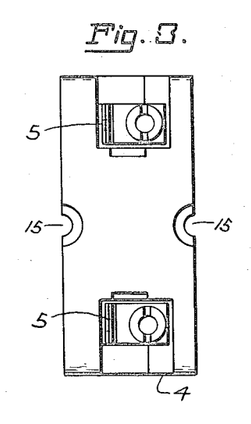
Figure 5:
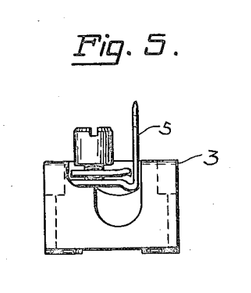
Figure 6:
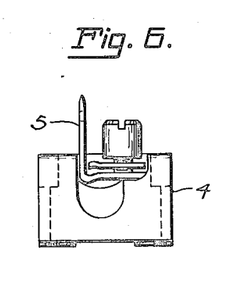

In Figs. 2 and 5, and 3 and 6 respectively are shown auxiliary base members or elements such as when equipped with connector elements constitute auxiliary base block units. Due to the peculiar construction of the connection and contact members used on the auxiliary base members or elements, it is in this particular embodiment of the invention necessary to provide what may be called a right-hand and a left-hand auxiliary unit, this designation referring merely to the positioning of the respective left or right-hand auxiliary units on the left or right-hand side of the main unit when such auxiliary units are used in conjunction with the main unit. It will, however, be evident that such right and left hand auxiliary units would not be necessary where other obvious forms of connection and contact members are used since this right and left hand arrangement is simply due to the peculiar disposition of the connection part of the connecting and contact member on the body portion of the base member or element. The left-hand auxiliary base member or element as illustrated in Figs. 2 and 5 I have in a general way designated by 3, and the right-hand auxiliary base member or element as illustrated in Figs. 3 and 6 I have in a general way designated by 4.

Referring now to both the main and the auxiliary base members or elements, the body portion thereof is generally of insulating material such as porcelain. The insulating bodies of the respective base members are provided with contacts such as the outwardly projecting portions of the wire connecting and contact members 5. The main base member or the insulating body thereof is furnished with six of such wire connection and contact members 5 arranged in three pairs, while the bodies of the auxiliary base members 3 and 4 are provided with merely one pair of such wire connecting and contact members 5. The connection and contact members 5 are of substantially similar construction to those shown in my copending applications already referred to, there being provision for connecting the proper wires to the connection and contact members for the same purposes and in the same general manner and arrangement as shown and described in said application.

In connection with each pair of wire connecting and contact members as 5 or equivalent means, may be provided a connector element or member, and this may be of any desirable nature, for instance in one case I might utilize a plain connector, in another I might use a fused connector, and in turn this fused connector might be any one of several types as already fully set forth in the two applications specifically identified.

Figures 7, 8, 15:
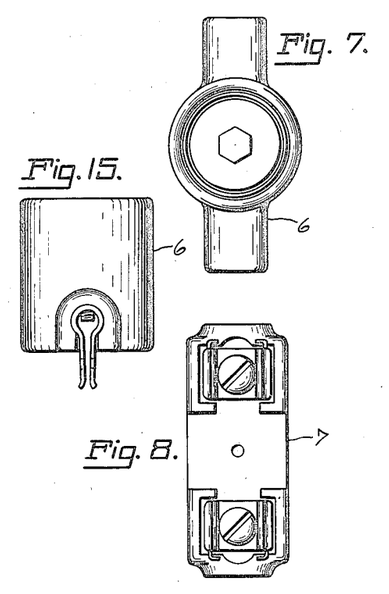
Figs. 7, 8, 9 and 10 are top face views of a plug-fuse-carrying connector, inclosed-fuse-carrying connector, link-fuse-carrying connection and plain or unfused carrying connector.
Figs. 15, 16, 17 and 18 are end elevations of the connectors shown in Figs. 7 to 10 inclusive.
Figure 9:
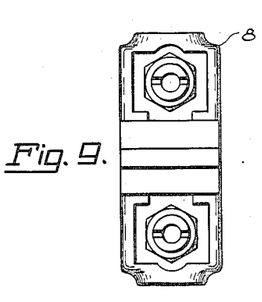
Figures 10, 14, 18:
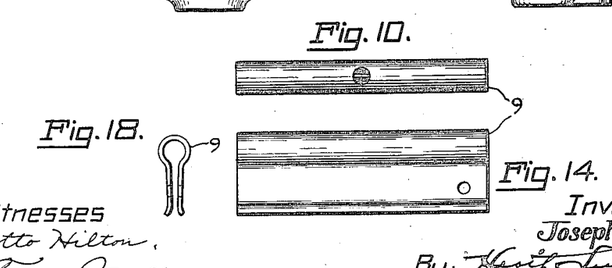
Figs. 11, 12, 13 and 14 are side elevations of the connectors shown in Figs. 7, 8, 9 and 10 respectively.
Figure 11:
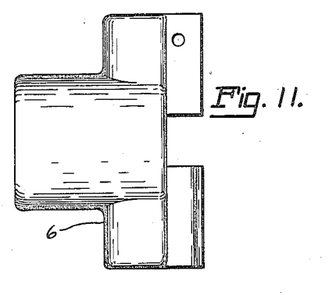
Figures 12, 16:
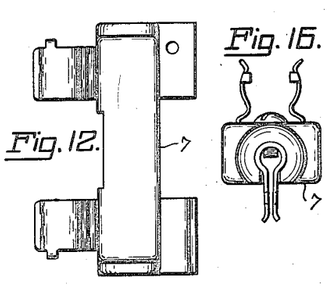
Figure 13:
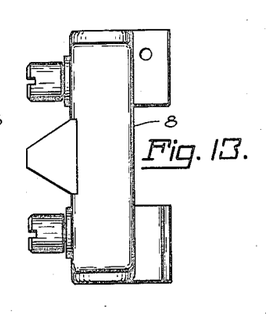
Figure 17:
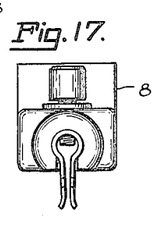

In Figs. 7 to 18 inclusive I have shown various types of connectors. Figs. 7, 11 and 15 illustrate a plug fuse carrying connector 6; Figs. 8, 12 and 16 illustrate an inclosed fuse carrying connector denoted by 7; in Figs. 9, 13 and 17 is shown a link fuse carrying connector 8, and in Figs. 10, 14 and 18 is represented a plain or unfused connector 9. In the applications noted and in other copending applications I have illustrated fully and described in detail the construction and mode of operation of the plug carrying, the link carrying and the plain or unfused connectors 6, 8 and 9 represented. The inclosed fuse carrying connector 7 differs only from the link connector 8 in the character of the fuse receiving contacts or connection which are in the form of the well-known ferrule contacting clips common in the fuse art instead of being the threaded studs and nuts such as are used in connection with the open exposed link carrying connector 8. When a connector is associated with a pair of wire connecting and contact members as 5, it is movable to open and close the connection between said members 5 and this relation I can very well secure as noted in my said prior applications by hinging the appropriate connector at one end to one of a pair of wire connecting and contact members in such manner that it can be moved into and out of engagement with the other or complemental wire connecting and contact member of that respective pair as fully set forth in the applications already identified. It will be obvious that any one of these several connectors or in fact any other that may meet the necessities of the case may be employed in connection with any pair of contacts on any one of the base members. For instance the main base member may in some cases have all its connectors plain or unfused, but ordinarily one of them would be plain or unfused, while the other two if present, would be fused in one of the several ways noted or possibly in others, or all three of them may be fused.

In order that my invention may be carried out to its most advantageous extent in this particular embodiment of the invention, it is desirable that the base members or elements of the main and auxiliary base block units be, when mounted, held or positioned in some fixed or definite manner or relationship. This is desirable in order that the distancing or spacing of the several connectors on the base block units will always be maintained in certain fixed relationship, one to the other, when several of them are used, whether these several be on a single base block unit such as the main base block unit or upon two or more auxiliary base block units or the main base block unit in conjunction with one or more auxiliary base block units. Such fixed and definite predetermined positioning of the base block units is highly advantageous in order that certain standard or fixed arrangements in the switch operating and testing elements may be accomplished and utilized. As I have already stated I have found it of advantage in the particular embodiment of my invention herein shown and described to have the main base block unit arranged to receive three connector elements, although all of these connectors need not necessarily be placed, and to have the auxiliary base block unit arranged to receive but a single connector element. Other embodiments of my invention may have main and auxiliary base block units otherwise equipped.

In order that the three connector receiving main base block units and the single connecting receiving base block units may be utilized either in conjunction one with the other or separately and be receivable or placeable in such fixed relation with the coöperating elements of the complete appliance such as the switch operating element which may form a part of such complete appliance, it is of advantage that either the casing or housing element when used, or some other foundation or supporting element on which the base block units may be mounted, be provided with some means for fixing the position of a unit or units with relation to a coöperative element of whatever nature the same may be. For this purpose where for instance a casing element or housing is used, the back or bottom presents a suitable supporting part and this back or supporting base will in such event be provided with suitable means such as those shown by which this condition will be insured. In Figs. 19 to 23 inclusive the part 10 is a back or foundation member which will be assumed to be a part such as the back of a casing 11 such as that represented in Figs. 24, 25 and 26. As illustrated this back 10 has threaded holes, openings or perforations 13 to receive screws as 14. While the number of these holes may vary decidedly, I have found that seven answer satisfactorily. The heads of the screws 14 overlie the bodies of the base members 2, 3 and 4 or similar base member if they are utilized in a particular appliance. The openings in the base members which receive the holding or securing screws 14 are generally formed in the insulating bodies thereof, and as a matter of convenience all the openings are denoted by 15.

The body of the main base member 2 has a complete central hole and two side holes or recesses 15 in its two opposite edges while the sides of the bodies of the auxiliary base members 3 and 4 have these half holes 15 in their side edges. As will be obvious this is merely one of several ways of holding the base members in position. It is, however, highly desirable and advantageous to so dispose the holes, notches or other screw receiving means in the body portion of the base members or elements, so that these base members or elements may be positioned on the foundation plate or member to produce the already stated definite positioning or distancing of the connector members on the base members.

By the construction noted universal interchangeability of main and auxiliary base block units on the foundation plate and their coöperative working with adjunctive elements is possible. For instance in Figs. 19 to 23 showing various mountings of the main base member or element and the auxiliary base members or elements together and separately is shown.

Figure 19:
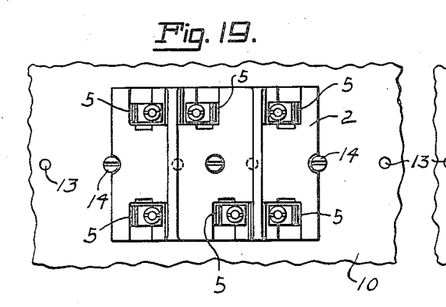
Figs. 19, 20, 21, 22 and 23 are face views of different mounts of base members of base block units.

Fig. 19 shows the mounting of a single main base element 2 serving when equipped with the proper connector members and other coöperative parts if needed as either a three-pole fuse block, a two-pole service connection and meter testing block unfused or fused as may be desired, a three-pole unfused or fused switch, and a two-pole meter testing switch, the central pole being non-switching.

Figure 20:
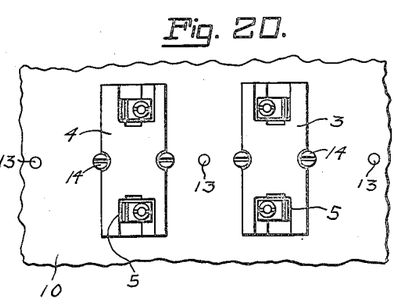

In Fig. 20 I have shown a mounting of the auxiliary base members 3 and 4 already described. In this particular arrangement the base member 3 which would ordinarily be at the left of the main base member, were this present in the combination, is now shown at the right, while the auxiliary base member 4 which if used in conjunction with the main base member would be at the right thereof, is here shown on the left side. It will be noted in the positioning of the auxiliary base members 3 and 4 in Fig. 20 that there is a space or interval between the two, approximately equal to the width of the body portion of an auxiliary base member and which space may be if desired occupied by such an auxiliary base member. It is also to be noted that the center lines of the connectors when positioned on each pair of contacts of each of the auxiliary base members of Fig. 20 will be the same as the distances between the centers of the two outer connectors when positioned on the main base member or element such as shown in Fig. 19. As a matter of fact whether there be one base member of compound or multipair contact type or there be an auxiliary base member, these centers of the connector members, when the latter are positioned on their mount of whatever nature the same may be, are in definite prescribed relations so as to always accurately and precisely be positioned for the junction therewith of a coacting element such for instance as a testing device or a switch operating device, merely two of several illustrations. The mounting and arrangement of the two auxiliary base members when equipped with the desired unfused or fused connectors to form the two auxiliary base block units may be used as either a two-wire cut out or a two-wire fused or unfused switch.

Figure 21:
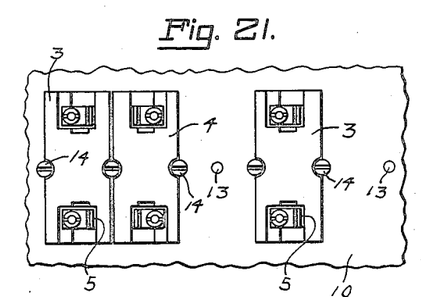

Fig. 21 shows a mounting of three auxiliary base members, there being two of these auxiliary base members as 3 and one as 4. It will now be noted that while the positioning of one of the auxiliary base members 3 and the auxiliary base member 4 is like the positioning of those base members in Fig. 20, the additional auxiliary base member like 3 is on the left-hand side of the auxiliary base member 4. In this construction, therefore, I have added to a mounting of auxiliary base members like that shown in Fig. 20 an additional auxiliary base member like 3. It will also be noted that the centers of the connector members are in the definite relation already described and furthermore the center of the connector member which would be in place on the additional auxiliary base member 3 as shown on the extreme left in this Fig. 21, would be in alinement or in the same position as if this auxiliary base member were placed on the left hand of the main base member or element 2 of Fig. 19. Further it will be perceived that the same space or interval exists between the auxiliary base member 3 on the right and the base member 4 in said Fig. 21 as already described in connection with Fig. 20. The particular combination or mounting of the three auxiliary base members as shown in this Fig. 21 provides an arrangement which may be used as a two-wire service connection and meter testing appliance, or a two-wire meter testing switch, and it will be understood in either case the connector members used on the base members to thus make up the three auxiliary base block units, may be either unfused or fused in any desired manner.

Figure 22:
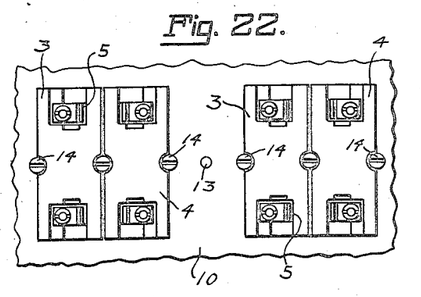

In Fig. 22 there are four auxiliary base members two like 3 and two like 4. The inner auxiliary base members 3 and 4 are positioned respectively at the right and left of the space between them and are in the same location as the similar members in Figs. 20 or 21. The auxiliary base member 3 on the left-hand end or side of the auxiliary base member 4 is positioned like the similar member in Fig. 21, whereas on the extreme right of said Fig. 22 is an auxiliary base member 4 occupying the same relative position to the base member 3 immediately to the left of it as the base member on the opposite end of Fig. 22 occupies to the base member 4 immediately to the right of it. The mounting or combination of auxiliary base members shown in Fig. 22 may serve as a four-wire fuse cut out device; as a three-wire service connection and meter testing device, the neutral wire passing through; as a three-wire meter testing switch with the two outside wires of the three-wire circuit being opened or closed, the neutral passing through or as a four-wire switch. It will be understood as already indicated that in conjunction with any of the appliances or devices stated the connectors may be either unfused or fused in any desired manner, and as before, their centers will be in the definite relation to which I have already referred.

Figure 23:
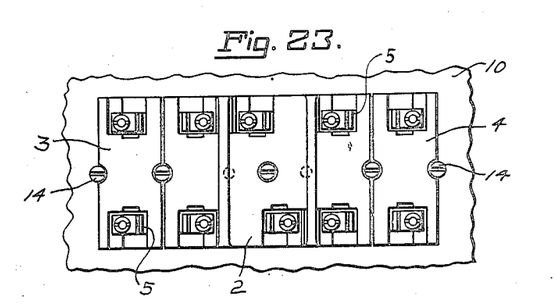

Fig. 23 shows a combination of both main and auxiliary base members. Here there is shown a main base member like 2 positioned to correspond with the positioning of the main base member 2 in Fig. 19, and in conjunctive and coöperative relation thereto are shown auxiliary base members 3 and 4 positioned on the left and right-hand side of the main base member 2, their location being exactly like the outer auxiliary base members 3 and 4 of Fig. 22. Here again it will be noted that the center spacings or distances of the connector members when mounted on the base members to form the main and auxiliary base block units are like those of the previous combinations; that is they are definitely gaged distances apart. This combination of main and auxiliary base members, forming when equipped with their respective connector elements whether fused or unfused, main and auxiliary base block units, serves as a five-wire fused cut out; a three-wire service connection and meter testing device; a three-wire meter testing switch; a five-pole plain or fused switch; a four-wire polyphase service connection and meter testing block and may serve other purposes. This complete mounting or combination in its entirety presents an appliance similar in arrangement as the service connection and meter testing block or the meter testing switch of my copending applications hereinbefore mentioned.

The foundation member, of whatever character it may be, whether it presents the back or other part of a box or equivalent, thus becomes standard, so that it can be employed as a foundation or base for any one or more of the base members already described or any others in fact that may be adapted to my purpose.

In describing Figs. 19 to 23 I have assumed that the part 10 in these several views is the same thing. By this I do not necessarily mean to imply that this part 10 is the back of a specific box but rather that it is a device intended to removably or detachably receive any one or more of the several base members in such way that certain parts of these base members may be brought into the precise predetermined position to carry in effect a prescribed function when used in conjunction with coöperative elements. It is obvious that for instance two auxiliary base elements or members may be added to the main base member shown alone in Fig. 19 or conversely if desired to permit the appliance shown in Fig. 23 to perform a different function, the two auxiliary base members there shown may be taken away. Similar changes in the combinations shown in the other figures may be made, for as will be clear, the invention does not reside in any specific arrangement, but as to one of its phases in the use of certain elements whereby universality is attained in the coöperative functioning of base block units conjunctively with other elements or coöperative devices when these are present.

Figure 24:
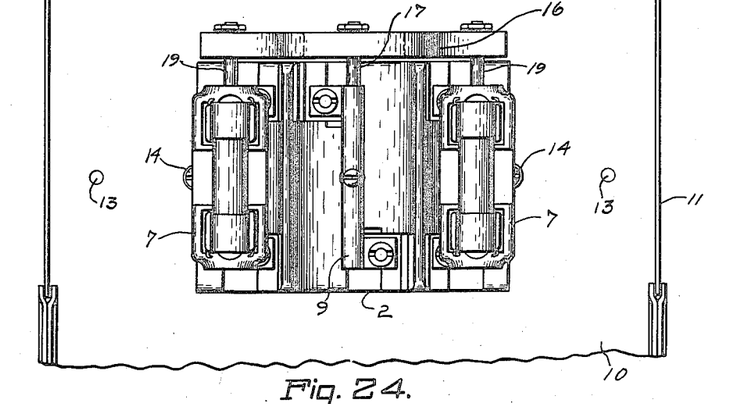
Fig. 24 is a face view of certain of the parts operatively related and incased to present a three-pole inside operated switch, the cover of the casing being removed and the casing being broken away.
Figure 25:
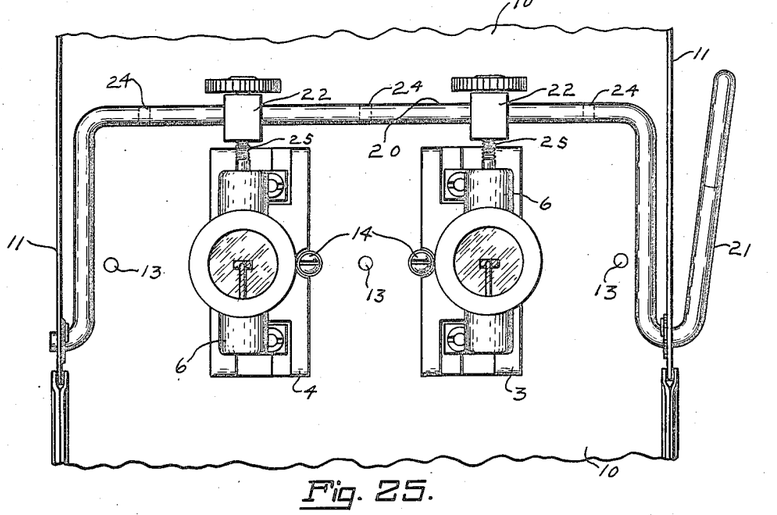
Fig. 25 is a similar view of parts assembled to present a two-pole exteriorly-operable switch.
Figure 26:
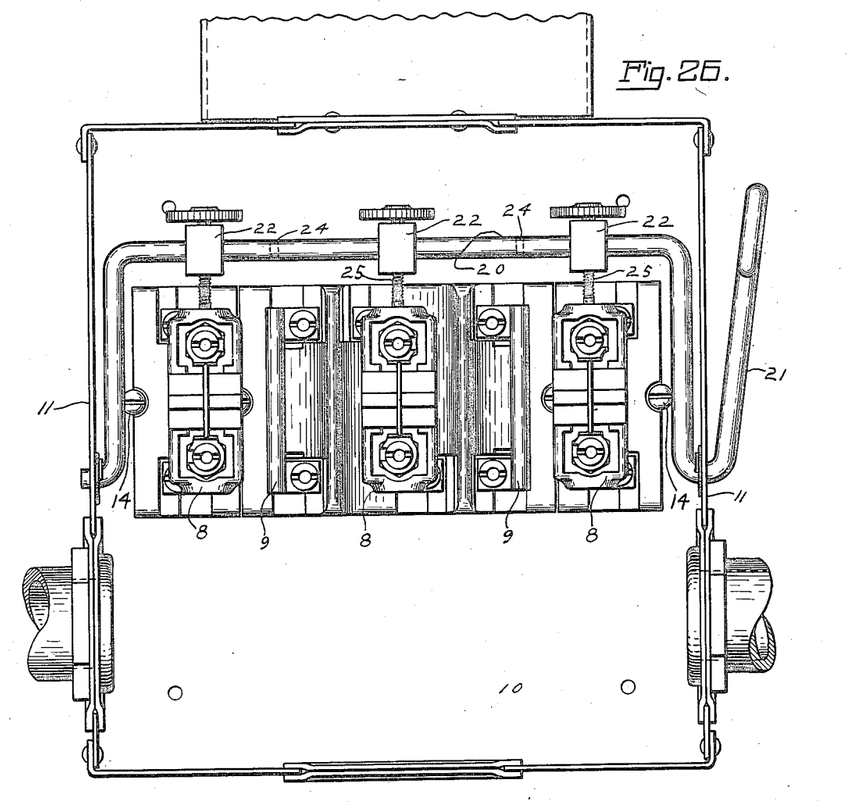
Fig. 26 is a view of a three-pole electric-meter-testing switch, with the parts incased in a protective housing, the switch-operating element being accessible exteriorly of the casing.

Illustrative of organized appliances showing some of the several mountings shown in Figs. 19 to 23 inclusive, I have shown the devices of Figs. 24, 25 and 26.

Figure 27:
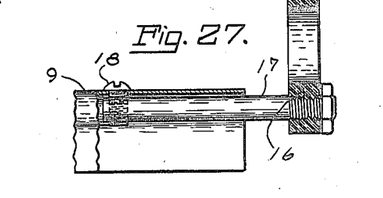
Fig. 27 is a sectional detail showing a way of connecting the switch-operating element of Fig. 24 with one of the connectors thereof.

In Fig. 24 there is shown what may be termed an inside operative three-pole switch, incased or housed in a box or casing indicated by 11. The mounting of the main base member 2 is like that shown in Fig. 19. Said base member is equipped with two inclosed fuse carrying connectors 7 such as shown in Figs. 8, 12 and 16 on the outside pairs of its contacts, while the central pair of contacts is equipped with an unfused connector 9 as shown in Figs. 10, 14 and 18. The main base block unit thus presented with its three connectors may be used for the different purposes already stated, but in this particular showing it is coöperatively combined with a switch operating device indicated in its entirety by 16 (see also Fig. 27). Referring to the latter figure, what is shown as the central stud 17 of the operating device 16 enters the socket or tubular portion of the intermediate connector 9 (Fig. 24) and is held removably therein by the screw 18. The outer studs 19 of the operating member 16 enter the socket portions or tubular heads of the outer or fuse carrying connectors 7 and may be held therein by the screws holding the clips of said connectors. It will be obvious by means of the device 16 the connectors may be caused to open and close the connection between the contacts of the respective pairs of connection and contact members.

Figure 28:
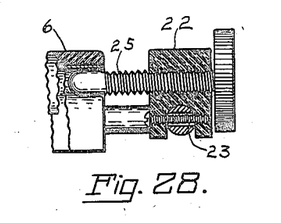
Fig. 28 is a sectional detail showing a way of detachably connecting the switch-operating elements of Figs. 25 and 26 with the connectors thereof.

In Fig. 25 the mounting of the auxiliary blocks 3 and 4 is exactly like that shown in Fig. 20 only that in this case the switch operating device is accessible exteriorly of the casing or boxing 11. This exteriorly governed switch operating device comprises a bail-like body, the terminals of which are pivotally supported by the sides or opposite walls of the casing 11, one of the terminals being continued to form a handle 21 which can be grasped to actuate the switch operating member 20 as occasion requires. The transverse portion of the bail-like or yoke-form body of the switch operating member as shown has blocks as 22 generally of insulating material such as fiber and shown in detail in Fig. 28. As represented these blocks are removably connected with the transverse portion of the body of the operating member 20, being positionable on said transverse body in definite or gaged position so as to coöperate with connector members on the base block unit or units when in any of the various mountings. As shown these insulating blocks 22 straddle the transverse portion of said operating member body, being held in predetermined positions by screws as 23 or equivalent means passing through perforations as 24 in said transverse portion. It should be noted that these perforations are at definite distances apart, so that the spacing from center to center thereof corresponds with the spacing of the respective connector members on the base block units placed and positioned in the mountings described. It, therefore, follows that when an insulating block or analogous member 22 is in fixed position upon the operating member 20, that said part 22 will be in such relation that means upon it will be precisely positioned for accurate union or coupling with a coöperating connector. The auxiliary base members 3 and 4 of Fig. 25 are furnished with plug fuse carrying connectors 6 such as shown in Figs. 7, 11 and 15, and the means for coupling or detachably connecting these connectors 6 with the operating device 20 may vary. The screws 25 answer satisfactorily in this connection. These screws as shown are threaded through the blocks 22, their inner plain ends being projectible into and removable from, as occasion may require, the coöperating socket or tubular head portions of the coöperating connectors 6 or any other connectors that may be substituted for them.

In the appliance shown in Fig. 25 I have represented a two pole fused switch, the operating element of which is accessible exteriorly of the casing in which the base block units are mounted. It has been shown that the operating member 20 is provided with means whereby it may be equipped with one or more definitely placed or positioned blocks with their associated parts, or other means, for connecting the operating member with one or more connector members on the base block unit or units. In the particular showing of Fig. 25 only two of such coupling means are provided coöperating with the two connectors of the two base block units. It will be obvious from what has been said that instead of there being only two such coupling means, there may be more than two and also that instead of the coupling means being positioned in the exact location on the member 20 as shown in Fig. 25, there may be in any other of the predetermined locations. For instance if it is desired to provide a three-pole switch operating device or element, then the two blocks with their coupling pins already placed would remain and another may be placed centrally between them. Or, if desired, instead of having the two blocks with their coupling pins located as shown in Fig. 25, they may be placed to the right or the left of the positions there shown as occupied. In other words, the switch operating element will be provided with the requisite number of coupling means or equivalent instrumentalities to permit it to properly connect or coact with the requisite number of connectors to provide the proper poled or wire switch.

In connection with the last above observation, reference may be had to Fig. 26 in which there is shown what may be called a three-wire meter testing switch in which the two outside legs or poles as well as the neutral pole of the three-wire circuit are opened and closed by the three link fuse connectors 8, while the other two connectors 9 are plain or unfused and serve on the load side of the meter testing switch. These two unfused connectors do not function as circuit controlling switching members, but merely, in this particular association and combination of the parts, serve as meter testing connectors. The switch operating element 20 is the same as that shown in Fig. 25 as are also each of the blocks 22 with their associated coupling screws 25. The connection, therefore, of the switch operating member 20 through the medium of its coupling means with the connector member is as already described. In the appliance shown in Fig. 26 the mounting of the base members is that of Fig. 23. The complete device, therefore, forms a meter testing switch of the character already noted which functions, operates and serves in the same manner as the meter testing switch described and illustrated in my copending application Serial No. 13,895, filed March 12, 1915.

Wherever an appliance is organized for testing, I prefer that the connector member or members which are movable in testing should be shaped for coöperative association with a by-pass device or any other appurtenance that may be used in testing and also that when a connector is opened for by-passing or any other procedure in testing, one of its contacts shall be accessible for testing purposes. It will also be obvious from what has been said, that any of the base block units connectors on any of the base block units may serve as circuit controlling switch members to form a switch in conjunction with the switch operating means of any desired polarity, while at the same time these same connectors may also function as meter testing connectors, or if desired, the connectors may serve either of the above stated purposes alone or any of the other described functions.

I have only shown several of a very large number of combinations producible by the elements to which I have alluded. There are, as will be understood to those skilled in the art, an exceedingly large number of combinations possible, and each combination produces an appliance.

As an important incident to the invention, the title having as noted been selected for convenience, is involved a method, art or process, as will be obvious on an inspection of the appended claims.

What I claim is:

1. A base block unit comprising a base, a pair of contacts and a connector to make and break connection between said contacts, said base block unit being provided with means to function for circuit controlling or meter testing purposes, the said base block being usable alone as stated or in conjunction with coacting means to present an appliance of different structural character serving also for circuit controlling or meter testing purposes, and said base block unit being also adapted to coact with a complemental base block unit, the two units when operatively related with each other, or with coacting means, presenting an appliance of a different character electrically or structurally.

2. A base block unit comprising a base, a plurality of pairs of contacts and a connector coöperative with each pair of contacts, said base block unit having means to permit it to function for circuit controlling or meter testing purposes, the said block base unit being usable alone as stated or in conjunction with coacting means to present an appliance of different structural character serving also for circuit controlling or meter testing or both purposes, and a second base block unit comprising a base and a single pair of contacts and complemental connector, and having means to permit it to function for similar purposes, the two base block units when operatively related with each other or with coacting means presenting an appliance of a different character electrically or structurally.

3. An appliance serving for circuit controlling or meter testing purposes comprising a plurality of base block units, each of which is composed of a base and at least a single pair of contacts and a complemental connector, said base block units being each provided with means to function either in themselves or collectively for circuit controlling or meter testing purposes and said appliance having means whereby the number of base blocks used may be either increased or decreased to change said appliance to one of different character.

4. Two base block units, each of said units comprising a base, a pair of contacts and a connector to make and break connection between said contacts, one of said units being fitted with a single pair of contacts and complemental connector and another of said units being fitted with a plurality of pairs of contacts and complemental connectors, each of said units being provided with means to function for circuit controlling or meter testing purposes and being usable alone or in conjunction with coacting means to present an appliance of different structural character serving also for circuit controlling or meter testing or both purposes or being adapted to serve together for similar purposes and said units being also adapted to coact with a complemental unit or units, the plurality of units when operatively related with each other, or with coacting means, presenting an appliance of a different character electrically or structurally.

5. A base block unit comprising a base, a pair of contacts and a connector provided with means to serve for circuit controlling or testing purposes, the said base block unit being usable alone or in conjunction with coacting means to present an appliance of different structural character serving also for circuit controlling or meter testing purposes and said base block unit being also adapted to coact with a complemental base block unit, the two units when operatively related with each other, or with coacting means, presenting an appliance of a different character electrically or structurally.

6. In an electrical appliance, means whereby said appliance may serve for circuit controlling or meter testing or both purposes, said means including a base block unit having means to permit it to function for circuit controlling or meter testing purposes, the appliance being provided with means whereby one or a plurality of said units may be coöperatively arranged to permit said appliance to serve for various purposes electrical or structural.

7. In an electrical appliance, means whereby said appliance may serve for circuit controlling or meter testing purposes, said means including a base block unit having means to permit it to function as stated for circuit controlling or meter testing purposes, the appliance being provided with means whereby one or a plurality of said units may be coöperatively arranged to permit said appliance to serve for various purposes electrical or structural, and adjunctive switch operating and testing appurtenances coöperative with said base block unit or units and forming a part of said appliance when said appliance is to be used for these purposes.

8. A plurality of base block units provided with circuit controlling members, switch operating means, and means for coupling or uncoupling said switch operating means with at least one of said circuit controlling means of at least two of said base block units.

9. A switch operating element and base block unit means comprising one or more base block units, each unit having circuit controlling means and the switch operating element having means for connection with one or several circuit controlling means in accordance with the arrangement of the base block units that may be comprised in said base block unit means.

10. A plurality of base block units each having a pair of contacts and a connector member coöperative therewith to make and break connection therebetween, means for holding the base block units in correlation, a switch operating member provided with means for connecting the same at will with any one or more of the circuit controlling means when the units are in said correlation, and one or more of said circuit controlling means when the same is disconnected from the switch operating member being movable independently of said switch operating member to expose at least one of its coöperating contacts for testing.

11. A main base block unit and an auxiliary base block unit, each of said base block units having means to permit it to function for circuit controlling or meter testing purposes alone or in connection with each other.

12. A main base block unit and an auxiliary base block unit, each of said base block units having means to permit it to function for circuit controlling or meter testing purposes alone or in connection with each other, and means for holding the base block units in correlation to each other to form a complete appliance serving for the purposes stated.

13. In an electrical appliance serving for circuit controlling or testing purposes, a foundation element provided with means for mounting thereon one or more base block units, each of said base block units having means to permit it to serve for circuit controlling or meter testing purposes, said foundation element being also provided with means to permit the coöperative use with said base block unit or units of coacting appurtenances to produce different structural or electrical arrangements.

14. In an electrical appliance serving for circuit controlling or testing purposes, a mounting element provided with means to permit of the attachment thereto of one or more base block units, which when so mounted serve with the mounting element to produce an appliance of a certain character electrically and structurally, and means coöperatively associated with said parts to permit of their re-arrangement either by themselves or with other parts to produce an appliance of a different character electrically or structurally.

15. An electrical appliance comprising a base block unit provided with a pair of contacts and a connector in coöperative relation with said contacts for circuit controlling, said unit being provided with means for the connection therewith of an independent appurtenance to change the structural identity of said appliance of which said unit forms a part and said unit being usable alone for said purpose or in combination with another unit to produce an appliance of still another structural identity.

16. A foundation member and a plurality of base block units, the foundation member being furnished with means for holding the units in different assembled relations thereon, each unit having circuit controlling means, and a switch operating member provided with coupling means in definite positions thereon corresponding with the positions of the controlling means, which said switch operating member is intended to operate.

In testimony whereof I affix my signature in presence of two witnesses.

JOSEPH SACHS.

Witnesses:
L. L. MARKEL,
HEATH SUTHERLAND.